No. 757,123. PATENTED APR. 12, 1904.
O. KAMPFE.
LAWN RAKE.
APPLICATION FILED JUNE 19, 1903.
NO MODEL.
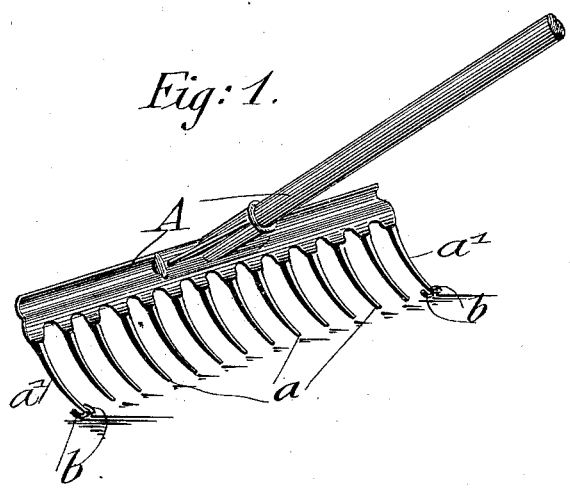
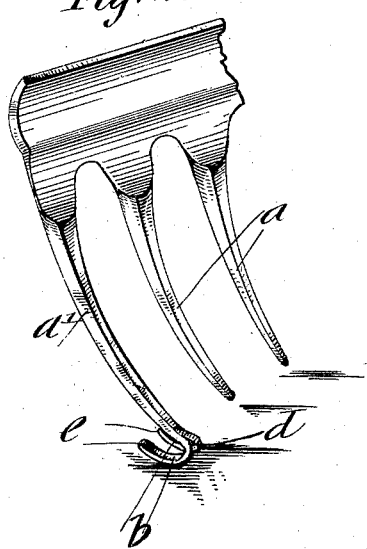
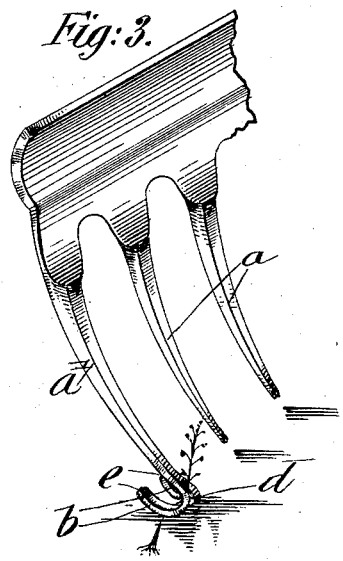

No. 757,123.

Patented April 12, 1904.

UNITED STATES PATENT OFFICE.

OTTO KAMPFE, OF NEW YORK, N. Y., ASSIGNOR OF ONE-HALF TO FREDERICK KAMPFE, OF BROOKLYN, NEW YORK.

LAWN-RAKE.

SPECIFICATION forming part of Letters Patent No. 757,123, dated April 12, 1904.

Application filed June 19, 1903. Serial No. 162,255. (No model.)

*To all whom it may concern:*

Be it known that I, OTTO KAMPFE, a citizen of the United States, residing in New York, borough of Brooklyn, and State of New York, have invented certain new and useful Improvements in Lawn-Rakes, of which the following is a specification.

This invention relates to an improvement in lawn-rakes, whereby they can be passed easier over the lawn without entering into the soil and injuring the roots or tearing up the sward, the end teeth acting in the nature of guides or shoes for the rake, as weed-extractors, and also for marking off the width of the furrows when planting certain vegetables; and for this purpose the invention consists of a lawn-rake the end teeth of which are provided with prongs which are bent backwardly and are somewhat longer than the intermediate teeth, so as to lift the intermediate teeth slightly above the soil of the lawn.

The invention consists, further, of a V-shaped recess formed by the sharp-cornered prongs for the unrooting of the weeds in the lawn, as will be more fully described hereinafter and finally pointed out in the claims.

In the accompanying drawings, Figure 1 represents a perspective view of my improved lawn-rake. Figs. 2 and 3 are perspective views of the end portion of the rake, drawn on a larger scale, so as to show clearly the backwardly-curved prongs of the end teeth; and Fig. 4 is a detail perspective view of one of the end teeth.

Similar letters of reference indicate corresponding parts.

Referring to the drawings, A represents an ordinary hand lawn-rake, and *a* the teeth of the same. The end teeth *a'* are provided at their lower ends or points with two backwardly-curved prongs *b*, that are forked so as to form a V-shaped recess *d* between them and which are provided with flattened ends *e*. The prongs *b* are made to extend at a greater depth than the lower ends or points of the intermediate teeth, so that when moving the rake over the lawn the curved prongs *b* of the end teeth *a'* form guides so that the intermediate teeth *a* will be lifted slightly above the soil without tearing up the roots or sward. The prongs of the end teeth form, so to say, shoes on which the rake is moved over the lawn, so that the intermediate teeth take up the leaves, extracted weeds, cut grass, and other matter to be removed from the lawn, while not tearing up the soil or injuring the sward. The prongs forming the V-shaped recess between the curved prongs of the end teeth are somewhat sharp-cornered and have the further advantage that objectionable weeds can be pulled up or unrooted from the lawn, which is accomplished by engaging the weed by the apex of the V-shaped recess of the end teeth, twisting the rake, and simultaneously lifting the same so as to pull out the weed, which is held at the apex of the V-shaped recess between the prongs. The prongs of the end teeth may also be used for marking the furrows in the soil when planting certain vegetables, the prongs forming furrows of certain width for this purpose. The prongs are preferably made integral with the end teeth by forging or otherwise and form a very inexpensive but useful improvement on the ordinary lawn-rakes.

Having thus described my invention, I claim as new and desire to secure by Letters Patent—

1. A lawn-rake, having a plurality of teeth, the points of the end teeth of which extend somewhat beyond the points of the intermediate teeth, and forked backwardly-curved and flattened prongs at the point of the end teeth, substantially as set forth.

2. A lawn-rake, having a plurality of teeth, the lower ends of the end teeth of which are provided with backwardly-curved and flattened prongs that are located slightly below the lower ends of the intermediate teeth, and a V-shaped recess between the prongs, substantially as set forth.

In testimony that I claim the foregoing as my invention I have signed my name in presence of two subscribing witnesses.

OTTO KAMPFE.

Witnesses:
PAUL GOEPEL,
C. P. GOEPEL.